(12) United States Patent
Pervan

(10) Patent No.: US 10,899,121 B2
(45) Date of Patent: Jan. 26, 2021

(54) DIGITAL PRINT WITH WATER-BASED INK ON PANEL SURFACES

(71) Applicant: CERALOC INNOVATION AB, Viken (SE)

(72) Inventor: Darko Pervan, Viken (SE)

(73) Assignee: CERALOC INNOVATION AB, Viken (SE)

( * ) Notice: Subject to any disclaimer, the term of this patent is extended or adjusted under 35 U.S.C. 154(b) by 220 days.

(21) Appl. No.: 15/980,056

(22) Filed: May 15, 2018

(65) Prior Publication Data

US 2018/0319148 A1 Nov. 8, 2018

Related U.S. Application Data

(62) Division of application No. 14/602,581, filed on Jan. 22, 2015, now Pat. No. 9,994,010.

(30) Foreign Application Priority Data

Jan. 24, 2014 (SE) ...................................... 1450069

(51) Int. Cl.
*B32B 38/00* (2006.01)
*C09D 11/107* (2014.01)
(Continued)

(52) U.S. Cl.
CPC ......... *B32B 38/145* (2013.01); *B41M 5/0011* (2013.01); *B44C 5/04* (2013.01);
(Continued)

(58) Field of Classification Search
None
See application file for complete search history.

(56) References Cited

U.S. PATENT DOCUMENTS 3,210,302 A 10/1965 Bowell
4,554,200 A 11/1985 Caines
(Continued)

FOREIGN PATENT DOCUMENTS

BE 1018213 A3 7/2010
CA 2 626 218 A1 5/2007
(Continued)

OTHER PUBLICATIONS

The Written Opinion of the International Search Authority dated Apr. 24, 2015 for PCT/SE2015/050063; 8 pages.*
U.S. Appl. No. 16/410,212, filed May 13, 2019, Pervan.
Pervan, Darko, U.S. Appl. No. 16/410,212 entitled "Method of Forming a Decorative Wear Resistant Layer," filed in the U.S. Patent and Trademark Office on May 13, 2019.
(Continued)

*Primary Examiner* — Helene Klemanski
(74) *Attorney, Agent, or Firm* — Buchanan Ingersoll & Rooney P.C.

(57) ABSTRACT

A water-based ink, produced by mixing pigments, binders and viscosity increasing substances such that they are specially adapted to provide and maintain a high quality print during heat and pressure, that no floating or bleeding of the ink drops should take place and that they are compatible with resins and materials used in the substrate such that no delamination or chemical reactions that affect design or surface properties in a negative way should take place. Additionally, a method to form a digital print with the water-based ink on a dense substrate including a polymer material or on surfaces that are heated and pressed after printing. The surface is, prior to the printing step, preferably heated in order to prevent floating of the water-based ink drops.

15 Claims, 3 Drawing Sheets

(51) Int. Cl.

| | | |
|---|---|---|
| *C09D 11/322* | (2014.01) | |
| *C09D 11/38* | (2014.01) | |
| *B41M 5/00* | (2006.01) | |
| *B44C 5/04* | (2006.01) | |
| B32B 37/24 | (2006.01) | |
| E04F 15/10 | (2006.01) | |
| B41M 7/00 | (2006.01) | |

(52) U.S. Cl.
CPC .......... *C09D 11/107* (2013.01); *C09D 11/322* (2013.01); *C09D 11/38* (2013.01); *B32B 2037/243* (2013.01); *B32B 2255/10* (2013.01); *B32B 2255/12* (2013.01); *B32B 2309/02* (2013.01); *B32B 2310/0831* (2013.01); *B32B 2317/16* (2013.01); *B32B 2419/00* (2013.01); *B32B 2419/04* (2013.01); *B41M 5/0047* (2013.01); *B41M 7/0027* (2013.01); *E04F 15/107* (2013.01)

(56) References Cited

U.S. PATENT DOCUMENTS

| | | |
|---|---|---|
| 5,141,599 A | 8/1992 | Jahn et al. |
| 5,405,681 A | 4/1995 | Nakayama et al. |
| 5,486,231 A | 1/1996 | Dulaney |
| 5,989,701 A | 11/1999 | Goetzen |
| 6,087,416 A | 7/2000 | Pearlstine et al. |
| 6,270,214 B1 | 8/2001 | Smith et al. |
| 6,310,115 B1 | 10/2001 | Vanmaele et al. |
| 6,565,919 B1 | 5/2003 | Hansson |
| 6,585,369 B1 | 7/2003 | Sievert et al. |
| 6,800,340 B1 | 10/2004 | Francescutti |
| 9,409,382 B2 | 8/2016 | Hakansson et al. |
| 9,605,168 B2 | 3/2017 | Pervan |
| 9,994,010 B2 | 6/2018 | Pervan |
| 10,017,950 B2 | 7/2018 | Pervan |
| 10,071,563 B2 | 9/2018 | Pervan |
| 10,328,680 B2 | 6/2019 | Pervan |
| 10,369,837 B2 | 8/2019 | Ryberg |
| 10,737,506 B2 | 8/2020 | Pervan |
| 2002/0061389 A1 | 5/2002 | Brooker et al. |
| 2003/0207083 A1 | 11/2003 | Hansson et al. |
| 2004/0061753 A1 | 4/2004 | Chen |
| 2004/0191547 A1 | 9/2004 | Oldorff |
| 2004/0250911 A1 | 12/2004 | Vogel |
| 2004/0266908 A1 | 12/2004 | Marguerettaz et al. |
| 2005/0193677 A1 | 9/2005 | Vogel |
| 2005/0247216 A1 | 11/2005 | Reichwein et al. |
| 2005/0249929 A1 | 11/2005 | Reichwein et al. |
| 2005/0259137 A1 | 11/2005 | Moffat |
| 2006/0179773 A1 | 8/2006 | Pervan |
| 2006/0194015 A1 | 8/2006 | Sabater et al. |
| 2006/0236642 A1 | 10/2006 | Pervan |
| 2007/0058018 A1 | 3/2007 | Ishibashi |
| 2007/0059492 A1 | 3/2007 | Oldorff |
| 2007/0193174 A1 | 8/2007 | Vogel |
| 2007/0224438 A1 | 9/2007 | Van Benthem et al. |
| 2007/0283648 A1 | 12/2007 | Chen |
| 2008/0000179 A1 | 1/2008 | Pervan et al. |
| 2008/0048388 A1 | 2/2008 | Gauss et al. |
| 2008/0152825 A1 | 6/2008 | Mukai et al. |
| 2008/0152877 A1 | 6/2008 | Mukai |
| 2008/0176039 A1 | 7/2008 | Chen et al. |
| 2008/0252709 A1 | 10/2008 | Ushiku |
| 2009/0031662 A1 | 2/2009 | Chen |
| 2009/0038256 A1 | 2/2009 | Thiers |
| 2010/0091058 A1 | 4/2010 | Hale et al. |
| 2010/0196678 A1 | 8/2010 | Vermeulen |
| 2010/0231671 A1 | 9/2010 | Liew et al. |
| 2010/0300030 A1 | 12/2010 | Pervan et al. |
| 2010/0307675 A1 | 12/2010 | Buhlmann |
| 2010/0323187 A1 | 12/2010 | Kalwa |
| 2011/0012954 A1 | 1/2011 | Brown et al. |
| 2011/0135815 A1 | 6/2011 | Ganapathiappan et al. |
| 2011/0151148 A1 | 6/2011 | Koenig |
| 2011/0177354 A1 | 7/2011 | Ziegler et al. |
| 2011/0180202 A1 | 7/2011 | Hirst et al. |
| 2011/0189448 A1 | 8/2011 | Lindgren et al. |
| 2011/0200750 A1 | 8/2011 | Meersseman et al. |
| 2011/0234727 A1 | 9/2011 | Aoki et al. |
| 2011/0247748 A1 | 10/2011 | Pervan et al. |
| 2011/0250404 A1 | 10/2011 | Pervan |
| 2011/0273515 A1 | 11/2011 | Takafumi et al. |
| 2011/0286493 A1 | 11/2011 | Torniainen |
| 2011/0303113 A1 | 12/2011 | Sarkisian et al. |
| 2012/0015107 A1 | 1/2012 | Schacht et al. |
| 2012/0113193 A1 | 5/2012 | Yamashita |
| 2012/0147108 A1 | 6/2012 | Ganapathiappan et al. |
| 2012/0169808 A1 | 7/2012 | Kiyomoto et al. |
| 2012/0178844 A1 | 7/2012 | Frey et al. |
| 2012/0229885 A1 | 9/2012 | Chen et al. |
| 2012/0249705 A1 | 10/2012 | Aoki et al. |
| 2012/0288689 A1 | 11/2012 | Hansson et al. |
| 2012/0320137 A1* | 12/2012 | Fujii .................. C09D 11/322 347/100 |
| 2013/0045364 A1 | 2/2013 | Sjöberg |
| 2013/0062006 A1 | 3/2013 | Meersseman et al. |
| 2013/0063528 A1 | 3/2013 | Govyadinov |
| 2013/0067842 A1 | 3/2013 | Meersseman et al. |
| 2013/0122255 A1 | 5/2013 | Chen |
| 2013/0284391 A1 | 10/2013 | Brinkmann |
| 2013/0286088 A1 | 10/2013 | Ryberg et al. |
| 2013/0305649 A1 | 11/2013 | Thiers |
| 2014/0017452 A1* | 1/2014 | Pervan ................. E04F 15/042 428/172 |
| 2014/0028772 A1 | 1/2014 | Pervan |
| 2014/0144583 A1 | 5/2014 | Hakansson et al. |
| 2014/0186610 A1 | 7/2014 | Pervan |
| 2014/0198168 A1 | 7/2014 | Pervan et al. |
| 2015/0064423 A1* | 3/2015 | Ohmoto ............... C09D 11/322 428/206 |
| 2015/0167319 A1 | 5/2015 | Saegart |
| 2015/0184013 A1 | 7/2015 | Double et al. |
| 2015/0210055 A1 | 7/2015 | Pervan |
| 2015/0218395 A1 | 8/2015 | Pervan |
| 2016/0208121 A1* | 7/2016 | De Mondt ............... B44C 5/04 |
| 2016/0250835 A1 | 9/2016 | Pervan |
| 2016/0332479 A1* | 11/2016 | Clement .................... B41J 2/01 |
| 2017/0152392 A1 | 6/2017 | Pervan |
| 2018/0354272 A1 | 12/2018 | Pervan |
| 2019/0085569 A1 | 3/2019 | Ryberg |
| 2019/0263101 A1 | 8/2019 | Pervan |

FOREIGN PATENT DOCUMENTS

| | | |
|---|---|---|
| CN | 101885200 A | 11/2010 |
| CN | 102781677 A | 11/2012 |
| CN | 102781677 B | 7/2014 |
| DE | 101 56 956 A1 | 6/2003 |
| DE | 10 2010 045 266 A | 3/2012 |
| EP | 0 739 743 A1 | 10/1996 |
| EP | 1 041 126 A2 | 10/2000 |
| EP | 1 328 407 | 5/2002 |
| EP | 1 242 702 | 9/2002 |
| EP | 1 314 766 A1 | 5/2003 |
| EP | 1 403 343 A1 | 3/2004 |
| EP | 1 242 702 B1 | 11/2004 |
| EP | 1 577 354 A2 | 9/2005 |
| EP | 1 577 354 A3 | 9/2005 |
| EP | 1 328 407 B1 | 8/2008 |
| EP | 1 980 598 A1 | 10/2008 |
| EP | 1 454 763 B1 | 8/2009 |
| EP | 2 202 056 A1 | 6/2010 |
| EP | 2 313 281 | 4/2011 |
| EP | 2 313 281 B1 | 7/2012 |
| EP | 2 623 567 A1 | 8/2013 |
| EP | 2 623 567 B1 | 11/2014 |
| JP | 2001-254503 A | 9/2001 |
| JP | 2008-265229 A | 11/2008 |
| JP | 2012-077446 A | 4/2012 |
| WO | WO 01/47717 A1 | 7/2001 |
| WO | WO 01/53387 A1 | 7/2001 |
| WO | WO 2004/042168 A1 | 5/2004 |

(56) References Cited

FOREIGN PATENT DOCUMENTS

| WO | WO 2005/097874 | A2 | 10/2005 |
|----|----|----|----|
| WO | WO 2006/001880 | A2 | 1/2006 |
| WO | WO 2006/088417 | A2 | 8/2006 |
| WO | WO 2007/015669 | | 2/2007 |
| WO | WO 2008/004960 | A2 | 1/2008 |
| WO | WO 2008/004960 | A3 | 1/2008 |
| WO | WO 2008/004960 | A8 | 1/2008 |
| WO | WO 2009/097986 | A1 | 8/2009 |
| WO | WO 2009/116926 | A1 | 9/2009 |
| WO | WO 2009/124704 | A1 | 10/2009 |
| WO | WO 2010/084386 | A2 | 7/2010 |
| WO | WO 2010/084386 | A3 | 7/2010 |
| WO | WO 2010/087752 | A1 | 8/2010 |
| WO | WO 2011/103641 | A1 | 9/2011 |
| WO | WO 2011/105613 | A1 | 9/2011 |
| WO | WO 2011/129757 | A1 | 10/2011 |
| WO | WO 2011/146149 | A1 | 11/2011 |
| WO | WO 2012/004701 | A2 | 1/2012 |
| WO | WO 2013/032387 | A1 | 3/2013 |
| WO | WO 2013/179260 | A1 | 12/2013 |
| WO | WO 2014/011110 | A1 | 1/2014 |
| WO | WO 2014/017972 | A1 | 1/2014 |
| WO | WO 2014/027179 | A1 | 2/2014 |
| WO | WO 2014/084787 | A1 | 6/2014 |
| WO | WO 2015/058974 | A1 | 4/2015 |

OTHER PUBLICATIONS

U.S. Appl. No. 13/873,773 (cited herein as US Patent Application Publication No. 2013/0286088 A1 of Oct. 31, 2013), Melker Ryberg and Jan Jacobsson, filed Apr. 30, 2013.
U.S. Appl. No. 15/028,873 (cited herein as US Patent Application Publication No. 2016/0250835 A1 of Sep. 1, 2016), Darko Pervan, filed Apr. 12, 2016.
U.S. Appl. No. 16/103,124 (cited herein as US Patent Application Publication No. 2018/035472 A1 of Dec. 13, 2018), Darko Pervan, filed Aug. 14, 2018.
U.S. Appl. No. 16/085,277, Melker Ryberg, filed Sep. 14, 2018.
U.S. Appl. No. 16/085,277, filed Sep. 14, 2018, Ryberg.
International Search Report issued in corresponding PCT/SE2015/050063, Apr. 24, 2015, ISA/SE, Stockholm, SE, 5 pages.
Extended European Search Report issued in EP 15740871.7, dated Oct. 9, 2017, European Patent Office, Munich, DE, 7 pages.
Pervan, Darko, et al., Technical Disclosure entitled Digital Printing and Embossing, IP.com No. IPCOM000224950D, IP.com PriorArtDatabase, Jan. 15, 2013, 89 pages (XP13155608 A).
Pervan, Darko, Technical Disclosure entitled "Digital Overlay," IP.com No. IPCOM000225271D, IP.com PriorArtDatabase, Feb. 5, 2013, 24 pages (XP 13155893 A).
Ryberg, Melker, U.S. Appl. No. 16/085,277 entitled "A Method for Forming a Décor on a Substrate," filed in the U.S. Patent and Trademark Office on Sep. 14, 2018.
Pervan, Darko, U.S. Appl. No. 16/864,411 entitled "Digital Print with Water-Based Ink," filed in the U.S. Patent and Trademark Office on May 1, 2020.

* cited by examiner

DIGITAL PRINT WITH WATER-BASED INK ON PANEL SURFACES

CROSS REFERENCE TO RELATED APPLICATIONS

The present application is a divisional U.S. application Ser. No. 14/602,581, filed on Jan. 22, 2015, now U.S. Pat. No. 9,994,010, which claims the benefit of Swedish Application No. 1450069-8, filed on Jan. 24, 2014. The entire contents of each of U.S. application Ser. No. 14/602,581 and Swedish Application No. 1450069-8 are hereby incorporated herein by reference in their entirety.

TECHNICAL FIELD

The disclosure generally relates to the field of digital printing with water-based ink on dense, non-porous surfaces such as resilient plastic surfaces or on surfaces that, after printing, are laminated or cured under heat and pressure to a core in order to form a panel, for example, LVT floors, laminate floors or powder-based floors.

FIELD OF APPLICATION

Embodiments of the present disclosure are particularly suitable for use in floors, which are formed of floor panels comprising a core, a decorative layer and, preferably, a transparent wear resistant structured layer above the decorative layer. Preferred embodiments are plastic-based LVT floors, laminate floors and powder-based floors. The following description of techniques, problems of known technology and objects and features of embodiments of the disclosure will therefore, as a non-restrictive example, be aimed above all at this field of application and in particular at floorings with a resilient surface layer.

It should be emphasized that embodiments of the disclosure may be used to produce a digital image on any surface, but flat panels such as, for example, building panels in general, wall panels, ceilings, furniture components and similar products that generally have large surfaces with advanced decorative patterns are preferred. The basic principles of embodiments of the disclosure may be used to apply a digital print on dense surfaces such as plastic materials or metal foils and polymer impregnated or coated paper or foils.

BACKGROUND

The following description is used to describe the background and products, materials and production methods that may comprise specific parts of preferred embodiments in this disclosure.

a) Laminate Floors

The majority of all laminate floors are produced according to a production method generally referred to as Direct Pressed Laminate (DPL). Such laminated floors have a core of 6-12 mm fibreboard, a 0.2 mm thick upper decorative surface layer of laminate and a 0.1-0.2 mm thick lower balancing layer.

The surface layer of a laminate floor is characterized in that the decorative and wear properties are generally obtained with two separate layers of melamine formaldehyde impregnated paper, one above the other. The decorative layer is generally a printed paper that may be digitally printed and the wear layer is a transparent overlay paper, which comprises small aluminium oxide particles. The paper sheets are laminated to a HDF core in large discontinuous or continuous laminate presses where the resin cures under high heat (about 170° C.) and pressure (40-60 bars) and the papers are laminated to the core material. An embossed press plate or steal belt forms the surface structure. Sometimes a structured paper is used as a press matrix. The embossings in high quality floors are made in register with the design.

b) Powder-Based Floors.

Recently new "paper free" floor types have been developed with solid surfaces comprising a substantially homogenous powder mix of fibres, binders and wear resistant particles hereafter referred to as WFF (Wood Fibre Floor). The powder mix may comprise aluminium oxide particles, melamine formaldehyde resins and wood fibres. In most applications, decorative particles such as, for example, colour pigments are included in the mix. In general, all these materials are applied in dry form as a mixed powder on a HDF core and cured under similar heat and pressure as used in laminate floors. Digital powder printing has been developed and it is possible to create very advanced designs of any type by injecting ink into the powder prior to pressing. The surface structure is made in the same way as for laminate flooring by a structured press plate, a steal belt or a paper press matrix that is pressed against the powder.

c) LVT Floors

Luxury Vinyl Tiles, generally referred to as LVT floorings, are constructed as a layered product made of thermoplastic PVC mixed with plasticizers. The name LVT is somewhat misleading since a major part of LVT floors have a plank size with a wood pattern.

Thermal moulding may be based on calendar rolling or extrusion is used to form the PVC layers. During the calendar rolling, the PVC material is heated to its softening temperature and exposed to pressure between cylinders and cooled down. The core is made primarily of several layers that are about 1 mm thick. The layers comprise PVC mixed with chalk and/or limestone fillers. A 0.1 mm high quality printed decorative PVC foil is applied on the upper side of the core. A transparent wear layer of vinyl with a thickness of 0.1-0.6 mm is generally applied on the decorative foil.

When PVC is heated it becomes soft like a paste and bonds under heat and pressure to other PVC materials but also to organic and inorganic fibres or minerals when cooled down to room temperature. The core layer, the decorative foil and the transparent layer are fused or laminated together with heat and pressure in continuous or discontinuous press operations. A transparent UV curing PU (polyurethane) lacquer is generally applied as a protective layer on the transparent PVC foil.

PVC expands under heat and shrinks when cooled down. The dimensional change is considerable within the temperatures that are used during production. Layers that comprise more vinyl expand and shrink more that layers with lower vinyl content. A balancing layer that comprises more vinyl than the middle layers is generally used in the lower part of the core to balance the transparent upper layer comprising primarily only vinyl (such as at least 95% vinyl).

LVT floors and other floor types described above have often an embossed structure and such structure may be a so-called EIR embossing where the décor is made in register with the embossing. The embossing is made with structured rollers or press plates. A high quality EIR embossing requires that a print is adapted to the thermal expansion and shrinkage during production and that the foil is applied with high precision on the core.

The laminated sheets are, after pressing, annealed to remove stress and to achieve increased dimensional stability. Calendar rolling, pressing and annealing general takes place at temperatures between 120° C.-160° C. Annealing may be combined with ageing at temperatures around 25° C.-30° C. during a few days.

PVC in LVT floors may be replaced with other thermoplastic materials. Chalk and or limestone fillers may be partly or completely replaced by other fillers for example wood fibres.

d) WPC Floors

Wood Plastic Composite floors, generally referred to as WPC floors, are similar to LVT floors. The core comprises thermoplastic material mixed with wood fibre fillers and is generally stronger and much more rigid than the mineral-based LVT core. A printed image is protected by a transparent foil or a UV-curable lacquer in the same way as in LVT floors. EIR may also be used.

Thermoplastic material such as PVC, PP or PE may be combined with a mix of wood fibres and mineral particles and this may provide a wide variety of floor panels with different densities and flexibilities.

The decorative effects in LVT and WPC floors may be obtained with a thermoplastic decorative foil that is printed separately and fused on the core layers. The foil comprises a single colour that generally is white and covers the dark colour of the core. The foil provides a base colour for the rotogravure printing process where special solvent-based inks are used to create wood, tile and stone designs. A digital print may also be applied directly on a LVT or WPC core material. Digital printing of LVT and WPC floors is only on an experimental stage since it is difficult to print on the plastic foil and plastic core but would, if introduced, provide major advantages over conventional printing technology.

Definition of Some Terms

In the following text, the visible surface of the installed floor panel is called "front side", while the opposite side of the floor panel, facing the sub floor, is called "rear side".

By "up" is meant towards the front side and by "down" towards the rear side. By "vertically" is meant perpendicular to the surface and by "horizontally" parallel to the surface.

By "digital printing" is meant a digitally controlled ejection of drops of fluid that is used to position colorants in pre-defined patterns onto a surface.

Known Technique and Problems Thereof

The general technologies, which are used by the industry to provide a digital print is described below. The methods may be used partly or completely in various combinations with preferred embodiments of the disclosure in order to create a digital print according to embodiments of this disclosure.

High definition digital ink jet printers use a non-impact printing process. The printer has print heads that "fire" drops of ink from the print head to the surface in a very precise manner.

Industrial printers are generally based on a Single Pass Printing method, generally referred to as "flatbed" printing, which uses several fixed printer heads aligned side by side in several rows that cover the width of the printed media. In general, each row of print head prints one colour. The printed surface moves under the heads. Such printers have a high capacity and are generally custom made for specific applications.

A suitable printer head has to be used in order to obtain a high printing quality and speed. A printer head has several small nozzles that can shoot and apply droplets of inks in a controlled way in a raster pattern.

Thermal print head technology, generally referred to as bubble jet printing, use print cartridges with a series of tiny chambers each containing a heater. To eject a droplet from each chamber, a pulse of current is passed through the heating element causing a rapid vaporization of the ink in the chamber to form a bubble, which causes a large pressure increase, propelling a droplet of ink out through the nozzle and to the surface.

Thermal technology imposes the limitation that the ink must be heat-resistant, generally up to 300 C.° because the firing process is heat-based. Pigment-based ink comprising thermally activating binders cannot be used in thermal print heads.

Most commercial and industrial inkjet printers use the Piezoelectric printer head technology. A piezoelectric crystal material (generally called Piezo) in an ink-filled chamber behind each nozzle is used instead of a heating element. When a voltage is applied, the piezoelectric material changes shape, which generates a pressure pulse in the fluid forcing a droplet of ink from the nozzle. Piezo inkjet allows a wider variety of inks and higher viscosity than thermal inkjet.

The ink is the most crucial part of the digital printing technology. The ink must be adapted to the receiving surface, to the specific print head and to the quality requirements of the printed surface. In addition, several other crucial parts must be considered in flooring applications, for example, the fact that the print must be protected by a strong wear layer and that the printed image generally is exposed to high heat and pressure after printing when the digital image is incorporated into a floor panel.

A lot of ink types may be used. The main components are colorants that provide the colour, a binder that bonds the colorants to the surface and a liquid carrier that transfers the colorant and the binder from the print head in well-defined small drops to a surface with a non-contact application method.

The colorant is either a dye or pigment or a combination of both.

Pigments are very fine powder of solid colorant particles that are suspended or dispersed throughout a liquid carrier. Pigment-based inks are generally individually mixed together by using a pigment dispersion and several chemicals.

Pigment inks are generally more light stable, especially when exposed to UV light, and more fade resistant than dye-based inks. They are therefore used in almost all flooring applications.

The most commonly used ink types are classified depending on the main carrier fluid that is used. The main classes are: solvent-based inks, UV curing inks, oil-based inks and water-based inks.

The main ingredient of solvent-based inks is a mixture of solvents that is used as a carrier fluid. Pigments are bonded to a surface when the solvents evaporate. The major advantage of solvent inks is that they enable printing on flexible, uncoated plastic substrates such as for example vinyl. The major disadvantage is the vapour produced by the solvent and the need to dispose of used solvent. High-speed solvent printer use special drying equipment, usually a combination of heaters and blowers to heat the substrate immediately before and after the print heads apply the ink.

UV-curable inks do not evaporate. They cure by exposure to strong UV-light. A chemical reaction takes place where the photo-initiators cause the ink components to cross-link into a solid substance. The advantage of UV-curable inks is that they dry as soon as they are cured. They can be applied to a wide range of uncoated substrates. Disadvantages are that the ink and the UV curing equipment is expensive and cracking may occur if the print is made on a flexible substrate such as a plastic foil. In the flooring industry UV curing inks are often used in large flatbed printers, which print directly to rigid wood substrate where flexibility is not needed.

Oil-based inks use a very slow drying carrier fluid that is usually derived from a mineral oil. The advantage is that the printer is very easy to use and maintain, as the print head jets are very unlikely to clog with dried ink. The major disadvantage is that it can only be used on special porous surfaces, such as on dry pressed tile surfaces that are able to quickly absorb the oil-based carrier fluid applied onto the media base leaving the colorant on the surface.

Water-based digital inks comprising colour pigments are widely used to print on paper and textiles. Water-based inks have many advantages. They are environmentally friendly, cost competitive and may provide a high quality printing method in many different materials, provided that the materials have surface structures and properties that allow the liquid to partially penetrate into the upper part of the surface. Pigments dispersed in water do not stick to a smooth surface when the water dries. Pigments are similar to sand particles and may be easily removed from most dry and smooth surfaces. The water-based carrier fluid is therefore generally mixed with several other additives to provide special ink and print properties and binders that provide the adhesion of the pigments to a surface. A commonly used binder is water-based acrylic dispersion. A major disadvantage is that the drying time is rather long, in some applications more than one minute. Another disadvantage is that water-based ink cannot be used on non-ink absorbing or low-ink absorbing dense substrate material such as plastic surfaces since the ink drops float and forms clusters of larger drops that gives an unacceptable printing quality.

It is known that a so-called Binder and Powder (BAP) printing method may be used to provide a digital print. Conventional digital printing methods are divided in two separate steps comprising a separate application of a liquid binder generally referred to as "blank ink" and of dry colourants generally referred to as "dry ink". Coloured particles of dry ink are applied on a panel surface. Some particles are bonded by a digitally formed pattern of blank ink applied by a print head. Other non-bonded dry ink particles are removed and the remaining bonded particles form a digital decor. This two-step process may be repeated and several colours of dry ink may be applied such that an advanced multi colour high definition digital print may be formed. The major advantage is that rather simple water-based liquid substances may be used and the pigment-based dry ink colorants are very cost efficient since no pigment dispersions are needed. The BAP method is based on the main principle that the blank ink drops should bond the dry ink powder particles to the surface. Such drops will float in the same way as the water-based ink and the BAP technology is difficult to use on dense surfaces such as plastic surfaces.

WO 2009/018260 describes that LVT floors may be digitally printed and a print layer or a wear layer can be mechanically and/or chemically embossed. The print design can be in the form of a separate layer, or can be a design that is directly printed on the surface of the base layer or other layer through digital or analogue printing techniques. The print layer preferably is plastic or polymeric film such as PVC, vinyl containing polymer, olefin polymers, acrylic containing polymer, polyester, ionomer and/or other alloy film, etc. The disclosure comprises a general description of digital printing in LVT floor. There is no specific information in the disclosure related to ink types or printing methods that may be used to provide a high quality print in LVT floors.

US 2011/0180202 describes that digitally formed images such as sublimation dyes may be heat transferred onto vinyl flooring materials. Heat activation occurs in temperatures between 160° C.-210° C. and this is above the normal softening temperature of PVC material used in LVT floors. An enhanced thermo-mechanical property or the flooring material is therefore required that inhibits shrinkage from heat exposure. This is a major disadvantage and the printing method cannot be used in LVT floors comprising conventional PVC materials.

US 2012/0249705 describes a digital printing method comprising heating a low ink-absorbing recording medium to a temperature of 40° C. to 110° C. and performing printing using an aqueous ink composition containing a water-insoluble colorant, a paraffin wax, resin particles, and water. The ink printing method includes a first step of ejecting droplets of the aqueous ink composition to form an image on a substrate and a second step of heating the substrate. In the first step, the substrate is heated to a temperature of 40° C. to 80° C. and in the second to a temperature of 50° C. to 110° C. It is mentioned that the second step is not limited to a step of heating the substrate after printing and may be a step of heating the substrate before or during recording. However it is mentioned that when the heating temperature in the first step is higher than 60° C., the substrate made of PVC is rapidly softened and is likely to be deformed and it is difficult to transport the recording medium in the ink jet printer.

US 2012/0147108 describes a digital printing method including an ink-jet ink comprising water, pigments, acrylic polymer particles intended to print on a vinyl substrate. The method also includes a heating device that applies heat to the ink-jet ink after printing of about 50° C. to 100° C. to cause the acrylic polymer particles to fuse. It is mentioned that a heating device can be incorporated into a print system in order to heat the substrate at or near the time of printing. Alternatively, the heating device can be used to heat the ink during or after jetting onto the medium. The resulting printed image can be heated to a temperature that promotes ink film formation and plasticizing of the vinyl substrate, e.g., about 50° C. to about 100° C., but that is not high enough to cause the vinyl to flow.

US 2011/0234727 describes a digital printing method comprising heating a non-ink-absorbing substrate, for example vinyl, to a temperature range of 40 to 60° C., printing with an aqueous ink comprising pigments and acrylic resin and heating the printed substrate to a temperature range of 50 to 90° C. to dry the ink.

The low temperature of the first step as described in the known disclosure above is not sufficient to prevent floating of water-based ink drops and there is no solution to the problem that thermoplastic material, especially PVC, is deformed when high temperatures are applied prior to the print.

Several floor types as described above but also wall panels and furniture components are pressed and heated after printing. When a water-based ink is used it must be adapted to meet a lot of requirements. The water-based ink must be able to maintain a high quality print during heat and pressures and no floating or bleeding of the ink drops should take place. The ink must be compatible with the resins and materials that are used in the floor surface and no delamination or chemical reactions that affect the design or the surface properties in a negative way should take place. The ink must also be compatible with the ink heads and the ink composition should comprise cost efficient environmental friendly materials and chemicals. Preferably, no special pre coating of the printed surface should be required. There is a need to optimize and improve water-based inks and printing methods such that a better print may be obtained with more cost efficient printing methods.

The above description of various known aspects is the applicants' characterization of such, and is not an admission that the above description is prior art when the various technologies are used partly or completely in various combinations.

OBJECTS AND SUMMARY

The main objective of at least certain embodiments of the disclosure is to provide a water-based digital ink and a digital printing method that may be used to improve a digital print on dense surfaces such a plastic materials or on surfaces that after printing are laminated or cured with heat and pressure.

Embodiments of the disclosure are based on a first main principle where the printed substrate is heated to a high temperature prior to printing and the water-based ink comprises a formulation that is adapted to dry almost instantly when applied on a hot dense surface such that floating of ink drops is reduced and preferably eliminated.

Embodiments of the disclosure are also based on a second main principle wherein the substrate is firmly attached and connected to a panel material prior to printing such that problems related to thermal deforming of the substrate under high printing temperatures are reduced.

According to a first aspect of the disclosure a method of forming a building panel is provided, comprising:

heating a substrate to a temperature of at least about 80° C.;

printing a digital image with a print head by applying drops of a water-based ink on the heated substrate, wherein the water-based ink comprising a colorant comprising an aqueous pigment dispersion, a binder comprising an acrylic resin dispersion, preferably a thermally crosslinkable acrylate copolymer dispersion, and a viscosity increasing substance comprising glycol or glycerine;

applying a transparent wear resistant layer on the digital image;

connecting the substrate to a core of a panel with heat and pressure, thereby forming a building panel.

Preferably, the substrate is, prior to printing, connected to the core.

The core may comprise a thermoplastic material mixed with fillers.

The core may comprise wood fibres bonded with a thermosetting resin.

The substrate may, prior to printing, be laminated with heat and pressure to the core.

The substrate may be a thermoplastic foil or a melamine formaldehyde impregnated paper.

The substrate may, after printing, be embossed in register with the digital image.

The print head may be a Piezo print head configured to apply ink drops with a viscosity of at least about 5 cps.

The method may comprise applying essentially dry and coloured particles on the substrate prior to the application of the water-based ink.

The essentially dry and coloured particles may comprise a thermoplastic material.

The water-based ink may comprise about 15-35 wt % of the aqueous pigment dispersion, and about 5-20 wt % of the acrylic resin dispersion.

The water-based ink may comprise about 15-35 wt % of the aqueous pigment dispersion, and about 5-20 wt % of the thermally crosslinkable acrylate copolymer dispersion.

The substrate may be heated to a temperature in the range of about 80 to about 130° C., or in the range of about 10 to about 130° C.

The transparent wear resistant layer may be a foil comprising a thermoplastic material.

The digital image may be printed by using by spot colours. By using spot colours, the risk for bleeding is reduced.

Embodiments of the disclosure are based on a third main principle where a water-based ink has been produced by mixing pigments, binders and viscosity increasing substances such that they are specially adapted to provide and maintain a high quality print during heat and pressure, that no floating or bleeding of the ink drops should take place and that they are compatible with the resins and materials that are used in the floor surface such that no delamination or chemical reactions that affect the design or the surface properties in a negative way should take place. The ink is also compatible with the ink heads and the ink composition comprises cost efficient and environmental friendly materials and chemicals.

A second aspect of the disclosure is a water-based ink for digital printing on a substrate of a panel that after printing is pressed and heated to above 100° C. The water-based ink comprises a colorant of an aqueous pigment dispersion, a binder of an acrylic resin dispersion, preferably a thermally crosslinkable acrylate copolymer dispersion, and a liquid viscosity increasing substance comprising glycol or glycerine. The material composition of the water-based ink is 15-35 wt % of the aqueous pigment dispersion and 5-20 wt % of the acrylic resin dispersion such as the thermally crosslinkable acrylate copolymer dispersion. The boiling point of the water-based ink is above 100° C. and below 130° C. The viscosity of the water-based ink is above 2 cps and below 15 cps at 25° C. The boiling points discussed in the disclosure are determined at atmospheric pressure.

The liquid viscosity increasing substance may comprise glycols or glycerine that is miscible with water, has a boiling point above 100° C. and a melting point lower than an application temperature.

The liquid viscosity increasing substance may comprise ethylene glycol or propylene glycol or polyethylene glycol or diethylene glycol or butane diol or glycerine.

The liquid viscosity increasing substance may further comprise de-ionized water as a solvent.

The viscosity of the water-based ink may be about 5-12 cps at 25° C.

The boiling point of the water-based ink may be about 105-120° C.

The water-based ink may be configured to transfer from a liquid state to a solid state within less than one second when applied on a dense surface heated to about 100° C.

The water-based ink may comprise a wetting agent.

According to a third aspect of the disclosure a method of forming a decorative layer is provided, comprising:

heating a substrate to a temperature of at least about 80° C.;

printing a digital image with a print head by applying drops of a water-based ink on the heated substrate, wherein the water-based ink comprising an aqueous pigment dispersion, a binder comprising an acrylic resin dispersion, preferably a thermally crosslinkable acrylate copolymer dispersion, and a viscosity increasing substance comprising glycol or glycerine;

applying a transparent wear resistant layer on the digital image.

The substrate may prior to printing be laminated to a core of a panel.

BRIEF DESCRIPTION OF THE DRAWINGS

The disclosure will in the following be described in connection to embodiments and in greater detail with reference to the appended exemplary drawings, wherein, FIGS. 1a-d Illustrate an embodiment of a production of an LVT floor panel.

DETAILED DESCRIPTION

Figure 1A:
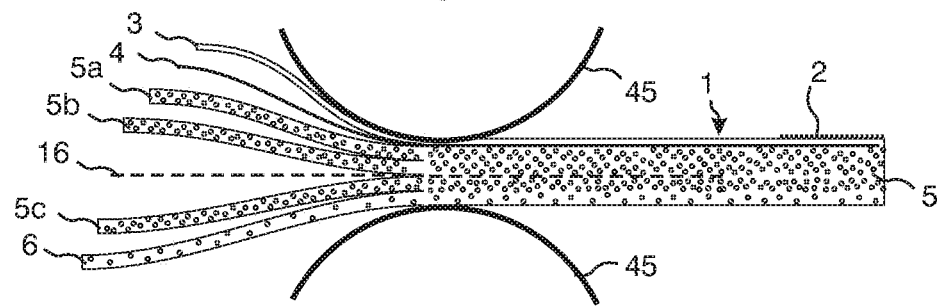

FIG. 1a shows a building panel in form of a LVT panel 1 that is formed continuously. The panel 1 has a core 5 that may comprise one or several core layers 5a, 5b 5c that are made primarily of PVC mixed with 20-80% chalk or limestone fillers mainly in order to reduce material costs. 2-4 cylinders may be used to produce each layer.

The core 5 has a substrate 4 on the upper side, which may be a printed decorative foil comprising thermoplastic material such polyvinylchloride (PVC). This decorative foil may be very thin and may have a thickness of about 0.05-0.15 mm. A transparent wear layer 3 comprising a thermoplastic material such as PVC is applied on the substrate 4. The transparent wear layer 3 may have a thickness of 0.2-0.6 mm. The core 5 comprises generally a stabilizing layer 16 to improve temperature stability. The stabilizing layer 16 may be a glass fibre layer. A balancing layer 6 may be included in the rear side of the core 5 in order to prevent curving. The core layers 5a, 5b, 5c, the substrate 4, the transparent wear layer 3, the stabilizing layer 16, and the balancing layer 6 are fused together in one or several steps with heat and pressure in a continuous operations where one or several rollers 45 or pressure belts are used to heat bond the layers. Binders may also be used to connect the core 5 to the upper layers. The heat bonding of thermoplastic materials such as PVC may be made in temperatures between 130° C.-160° C. and with a pressure of 5-10 bars. A higher pressure may be used. The transparent wear layer 3 may include a coating 2 of polyurethane (PU), which provides additional wear and stain resistance. The transparent wear layer 3 may be replaced with a polyurethane layer 2 that is applied directly on the substrate 4.

The substrate 4 and the transparent wear layer 3 and the balancing layer 6 may in all embodiments be replaced by, or may comprise, transparent or coloured thermoplastic powder such as for example Vestolit PVC powder that is preferably scattered, pressed and fused to an underlying layer of the panel 1. Foils and layers may be replaced by powder in the same way as paper in laminate floors is replaced with powder in order to form powder-based WFF surfaces. A core 5 comprising one or several core layer 5a-5c and preferably a glass fibre layer 16 is produced preferably continuously as described above. The continuous core may also be cut into panels prior to the application of the powder layers. Thermoplastic particles with or without pigments may be applied on the upper and/or lower part of the core 5. A binder applied for example by rollers or by spraying may be used to connect the powder to the core prior to the final pressing. Preferably the balancing layer 6 may comprise a binder.

The substrate, the transparent wear layer, the core layers, and the thermoplastic powder may comprise other thermoplastic material such as polyester, polypropylene (PP), polyethylene (PE), polystyrene (PS), polyurethane (PU), polyethylene terephthalate (PET), polyacrylate, polyvinyl butyral, or a combination thereof.

Figure 1B:
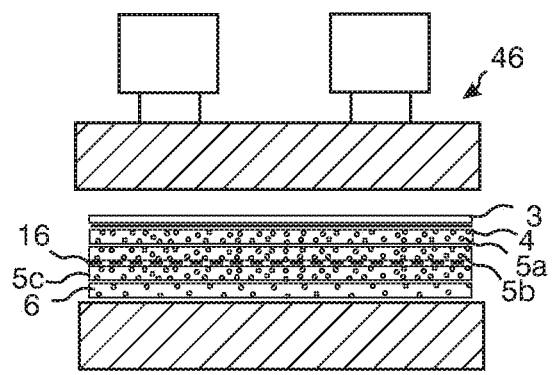

FIG. 1b shows schematically forming of a building panel in form of a LVT panel where the continuous pressing operation is replaced with a discontinuous press 46. The press 46 may have several openings, for example, ten openings and ten panels may be pressed in each opening during 30 minutes and cooled during 10 minutes.

Continuous forming is more cost efficient than discontinuous pressing and provides higher capacity and better quality. The majority of recent new investments in the industry are based on a continuous production process.

Figure 1C:
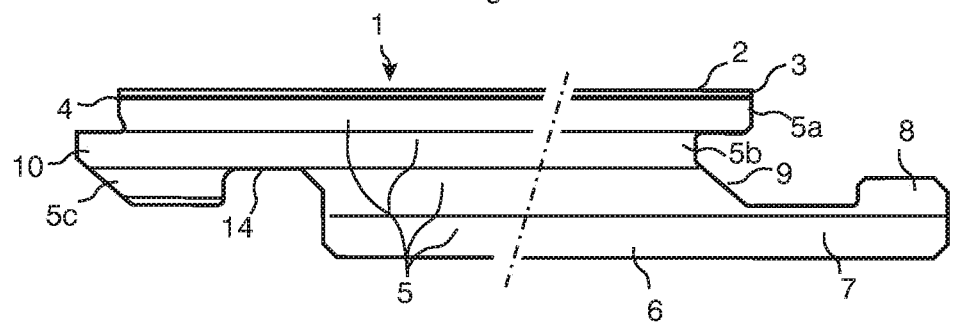

FIG. 1c shows a building panel in form of a LVT flooring panel 1 which is installed floating with a mechanical locking system comprising a tongue 10 and a tongue groove 9 for vertical locking and a strip 7 with a locking element 8 in a first edge that cooperates with a locking groove 14 in an opposite second edge and locks in horizontal direction. The panel may also have straight edges and may be installed by gluing down to the sub floor.

LVT floors which are intended to be installed floating with a mechanical locking system have generally a thickness of 3-6 mm. The lower side of the core 5 may comprise grooves or cavities in order to decrease the weight and to save material.

Figure 1D:
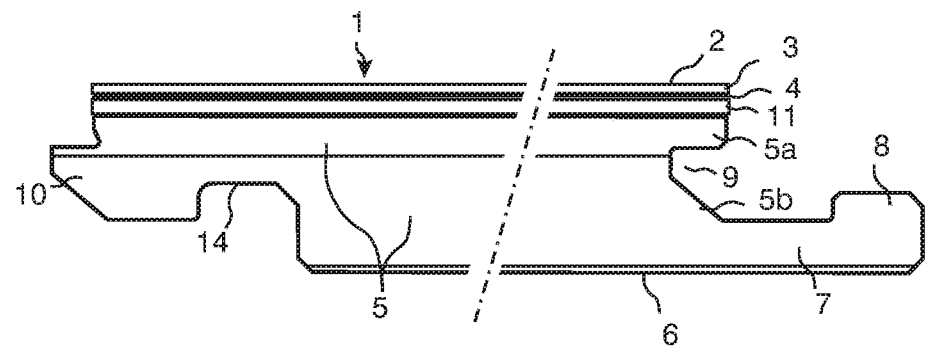

FIG. 1d shows a building panel in form of a floor panel with a resilient decorative surface similar to the embodiment shown in FIG. 1c and the surface layers may be powder-based as described above. The substrate 4 and the wear resistant layer 3 may have a sub layer 11 that preferably is softer than the substrate 4 and the wear resistant layer 3, and that may provide sound reduction. The core 5 is in this embodiment a HDF, a MDF core, or a WPC core comprising a composite material for example thermoplastic material, preferably polyvinylchloride (PVC) or polypropylene (PP) mixed with wood fibres. Many other core materials may be used, preferably moisture resistant materials such as cement bonded particleboards or other types of mineral-based board material. The core 5 may even comprise a ceramic material and the resilient upper layers may provide a soft surface with lower sound. Such panels with a ceramic core may also be installed floating and may comprise a mechanical locking system.

Figure 2A:
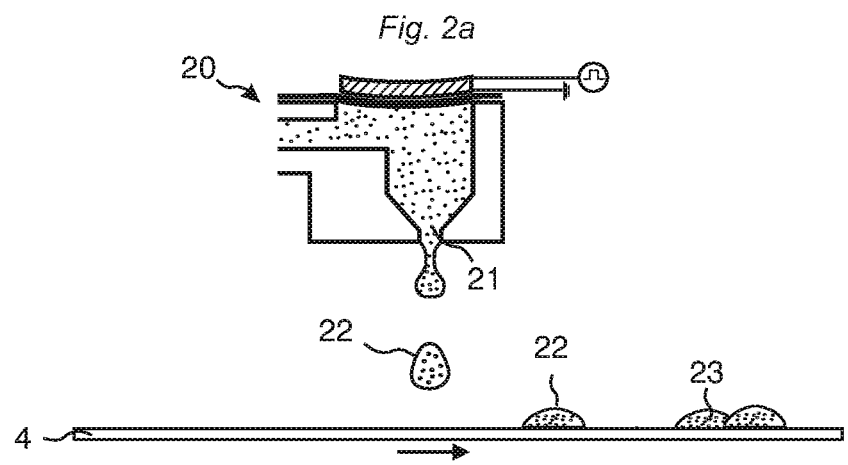
FIGS. 2a-f Illustrate an embodiment of a digital printing methods.

FIG. 2a shows a nozzle of a Piezo print head 20 that applies a water-based ink 21 as small drops 22 on a substrate 4 that in this embodiment is a PVC foil. The water-based ink has in this embodiment a material composition comprising:

an aqueous pigment dispersion a binder comprising an acrylic resin dispersion, preferably an aqueous dispersion of a thermally crosslinkable acrylate copolymer dispersion, glycol or glycerine preferably mixed with water as viscosity increasing substance adapted to meet the viscosity requirements of the print head.

A preferred material composition of the ink, based on weight (wt %), is about 30 wt % of the pigment dispersion, about 10 wt % of the acrylic resin dispersion such as the thermally crosslinkable acrylate copolymer dispersion, and about 60 wt % of the viscosity increasing substance as described above. The mix may vary and preferable inks may have a composition of 15-35 wt % of the pigment dispersion and 5-20 wt % of the acrylic resin dispersion such as the thermally crosslinkable acrylate copolymer dispersion and 45-80 wt % of the viscosity increasing substance. Such inks may have a boiling point of about 105-120° C. and they are suitable for printing on dense surfaces, especially thermoplastic surfaces, at increased temperatures. They are also compatible with thermoplastic resins especially melamine formaldehyde resins. The acrylic resin, such as a thermally crosslinkable acrylate copolymer, is such that it will start to cure prior to the floating of a melamine formaldehyde resin that generally starts at a temperature above 120° C. and pigment bleeding will be counteracted, or completely eliminated, when prints are made on surfaces used in laminate and powder-based floors.

The acrylic resin may be an acrylic or methacrylic binder. The acrylic resin may be a homopolymer or a copolymer of two or more monomers. Such a monomer may having a specific functionalization such as hydroxy, carboxy, epoxy, etc. A preferred acrylic binder is an aqueous anionic polymer dispersion such as Helizarin binder produced by BASF.

The aqueous pigment dispersion may comprises 2-5 wt % of pigments. The acrylic resin dispersion may comprise 40-50 wt % of the acrylic binder, for example a thermally crosslinkable acrylate copolymer. The acrylic resin dispersion may further comprise water, surfactants, additives, etc.

Most Piezo print heads are designed to work with a viscosity in the range of 2 to 12 centipoise. Higher viscosity heads are preferred in the range of about 5-15 cps since such heads gives more flexibility to provide an appropriate ink composition as described above. The water-based blank ink may easily be adapted to meet all possible viscosity requirements above 2 cps by including a viscosity increasing substance in the ink.

The viscosity increasing substance may, for example, comprise water-soluble polyethylene glycol (PEG) that is compatible with melamine resins and allows easy and fast curing when heat, and preferably also pressure, is applied. A preferred solvent that is compatible with thermosetting resins should be miscible with water, have a boiling point above 100° C. and a melting point lower than the application temperature. Examples of such, but not restricted to, are ethylene glycol, propylene glycol, polyethylene glycol, diethylene glycol, butane diol and glycerine. Combinations may also be used.

All ink formulations may comprise small amounts, about 1-2 wt %, of wetting agents such as for example BYK or Surfinol and chemicals such as Actidice intended for control of bacteria and fungi.

It is preferred that the amount of the pigment dispersion in the water-based ink is as low as possible since the major part of the ink costs is related to pigment dispersions. It is surprising that rather low amounts of pigment dispersions, for example, 15 wt %, may give an almost similar colour intensity as 35 wt %. Inks for flooring applications where photo quality is not needed, may be produced with a water-based pigment dispersion in an amount that is as low as 5 wt %. Any ratio between 5-35 wt % of the pigment dispersion may be used. Higher pigment ratios are generally not cost competitive.

FIG. 2a shows that the liquid substance of the water-based ink may not penetrate into a dense and smooth non-porous substrate 4 such as a thermoplastic foil, for example, a PVC foil, melamine formaldehyde impregnated paper, or a metal foil, for example an aluminium foil, and the ink drops 22 float in an uncontrolled way and form clusters of ink drops 22. The result is a low quality print that is not possible to use in flooring applications.

Figure 2B:
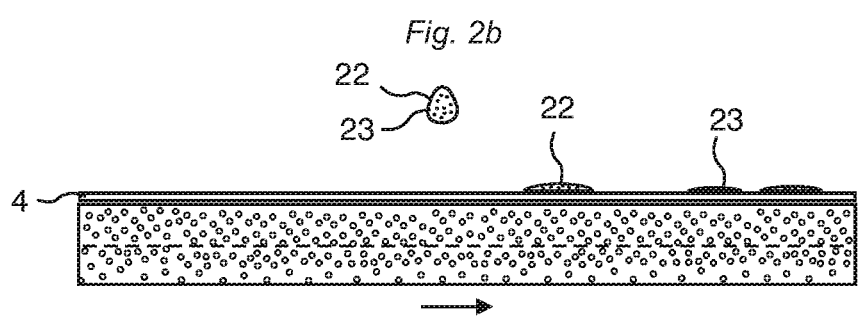

FIG. 2b shows printing with water-based ink on a dense, smooth and non-porous substrate 4 that may be a thermoplastic foil, for example, a PVC foil, melamine formaldehyde impregnated paper, or a metal foil, for example an aluminium foil, attached to a core 5 of a panel 1. The substrate 4 is dense and non-porous such as the ink drops 22 remain liquid on the surface of the substrate 4 after at least 5 seconds after application.

The panel 1 and the substrate 4 are heated, preferably to a temperature above 80° C., even more preferably to a temperature between 90 and 120° C. The acrylic binder in the liquid drops 22 comprising pigments 23 will at such high temperatures dry and cure almost instantly and floating of ink drops 22 will be reduced considerably at temperatures above 80° C. Floating will be reduced further if the temperature is increased to about 100° C. and especially if small drops 22 are applied, for example, drops of 5-20 picoliters. The ideal temperature is around the boiling point of the water-based ink, in this embodiment around 110° C. The heat from the production process may be used if the print is made after the hot bonding of the layers as shown in FIG. 1a. It is possible to obtain a very high quality print with water-based inks applied on dense surfaces such as a PVC foil if a suitable combination of high temperature, small drops and a high binder content is used. The printer is preferably equipped with a cooling system that prevents overheating of the print heads during printing.

The high temperature during printing may cause a thermoplastic foil to deform and an uncontrolled image size may be obtained after cooling. A disadvantage is that such designs are practically impossible to be combined with a high quality EIR forming of the surface with, for example, embossed cylinders or metal plates. Similar problems occur when a print is applied on a melamine formaldehyde impregnated paper. Such problems may be solved with a production method wherein the foil or the impregnated paper preferably is firmly attached to a core 5 as shown in FIG. 2b, for example, fused to a thermoplastic core or glued with for example a thermosetting resin to a HDF core.

Figure 2C:
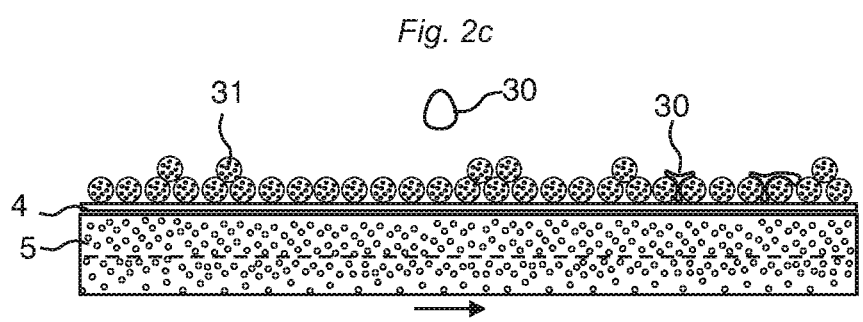

FIG. 2c shows schematically that a digital print may be formed in two steps with a binder and powder (BAP) printing method that has recently been introduced in flooring application by Välinge Innovation AB. A binder or a so-called blank ink 30 that does not have any colorants or pigments is applied digitally and is used to bond a powder or a so-called dry ink 31 that comprises pigments 23.

Figure 2D:
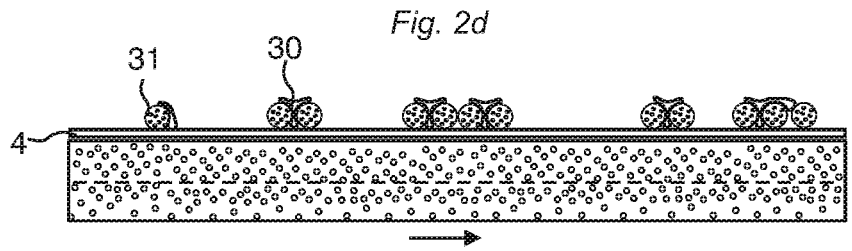

A powder-based dry ink 31, that may comprise small coloured particles for example thermoplastic particles comprising pigments 23, is applied randomly in dry form on a dense substrate 4 that may be a PVC foil. The small particles may also be formed by pigments bonded to thermoplastic particles for example Vestolit or wood fibres and the bonding may be obtained with a binder that may comprise an acrylic emulsion. The surface and the foil is heated preferably to a temperature above 80° C. or even more preferably to a temperature of about 100° C. The temperature should be below a softening temperature of the substrate and the dry ink powder such that the dry ink particles are not attached to the surface and may be easy to remove. A binder pattern or image is formed digitally by an ink head that preferably only applies a blank ink 30 comprising a liquid binder on the dry ink 31. The binder comprises preferably an acrylic resin, preferably an acrylic resin water-based dispersion. The binder in the blank ink 30 dries and cures when the drops are in contact with the hot dry ink particles 31 and the hot substrate 4. FIG. 2d shows that the blank ink 30 connects some particles of the dry ink 31 that form the same pattern as the blank ink 30 and a print is formed on the substrate 4 when non-bonded dry ink 31 is removed by for example vacuum and air pressure. Several colours may be applied and a multi colour high quality image may be formed in a cost efficient way since the costs for the blank ink 30 and the dry ink 31 are considerable lower than for conventional ink comprising pigment dispersions. The BAP method may provide a digital print with the same or even superior quality as conventional digital printing technology. A major advantage is that the print head does not have to handle pigments that may clog the nozzles of the print head.

Figure 2E:
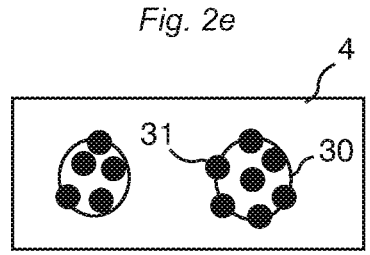

FIG. 2e shows that it is an advantage if the dry ink particles 31 are smaller than the diameter of the applied blank ink drops 22 such that a drop covers several particles, which are applied side by side or on top of each other. The blank ink drop should preferably have an ink volume that is sufficient to cover several particles and to penetrate to the surface. A normal size of an ink droplet is about 2-4 picolitres (=$1*10^{-12}$ litre or 0.000001 mm$^3$) and several drops may be applied on each other. The size of each droplet may be increased, dependent on ink type and head type, normally between 10-40 picolitres and this corresponds to a droplet that may have a diameter of about 30-100 microns. Dry ink particles with a size of about 10-20 microns are easy to bond and remove. It is possible to design print heads that may fire bigger drops up to 100-200 picolitres or more. Such larger drops may be used when a base colour is applied that contain large amounts of pigments.

Figure 2F:
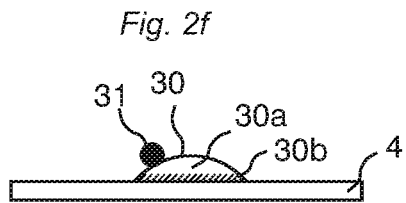

FIG. 2f shows that a BAP print may also be formed on a dense and heated surface 4 by a method where the blank ink 30 in step one is applied on a substrate 4 and dry ink 31 is thereafter applied on the blank ink 30. The binder in the blank ink, the temperature of the substrate and the time from the applications of blank ink to the application of the dry ink powder may be adapted such that only the lower part 30b of the drop that is in contact with the hot substrate 4 starts to dry and floating of the drop is prevented while an upper part 30a of the blank ink drop 30 is still wet and may bond a dry ink particle 31 that is applied on the drop 30.

An alternative method that may be used independently or that may be combined with the heating method above is to modify the blank ink and to increase the viscosity by, for example, increasing the glycol content. Preferably a viscosity exceeding 10 cps is used. Even more preferred is a blank ink with a viscosity exceeding 20 cps. Increased viscosity reduces the floating of ink drops and a high-resolution print may be obtained with the BAP method on plastic foils or on melamine/formaldehyde impregnated paper at normal printing temperatures. In fact it may be an advantage to apply blank ink on a substrate having a temperature of 20° C. or lower since the viscosity of glycol is higher at low temperatures.

Figure 3A:
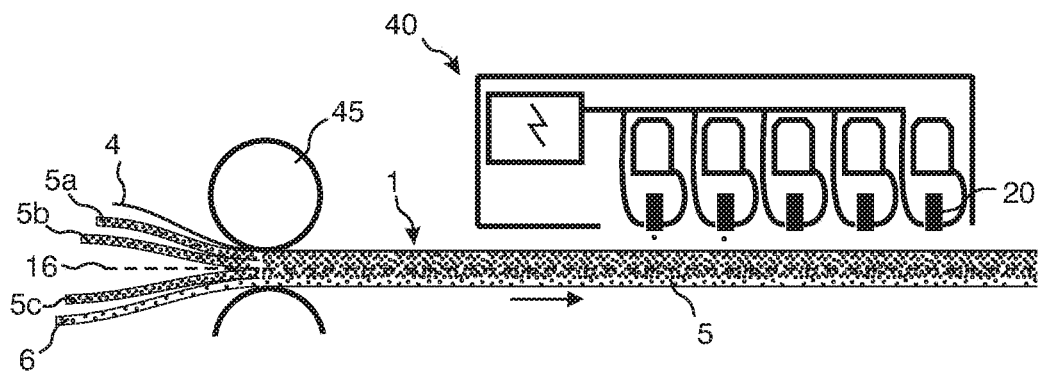
FIGS. 3a-d Illustrate an embodiment of a digital printing equipment.

FIG. 3a shows that a digital print with increased surface temperature may be formed in line with the lamination of the core layers 5a-5c, 6 and the substrate 4 that may comprise a basic colour. The digital print is printed by a digital printer 40.

Figure 3B:
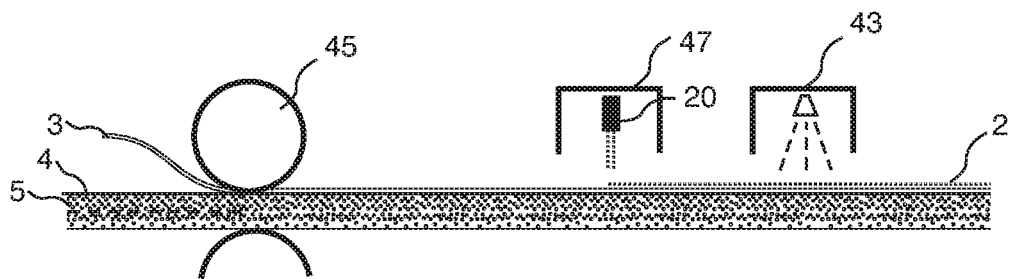

FIG. 3b shows that a transparent wear layer 3 may be fused on the printed substrate 4 and a protective PU (polyurethane) layer 2 may be applied with a PU applications station 47 that may be a roller or a digital print head 20. A UV curing station 43 cures the PU layer after application. The printing and lamination steps may comprise an intermediate heating operation where additional drying of the ink is made in order to increase the bonding of the transparent foil 3 to the print and the decorative substrate 4. A binder layer, preferably a water-based acrylic binder may also be applied on the substrate 4 and/or on the print and/or on the transparent foil 3 in order to increase the bonding.

Figure 3C:
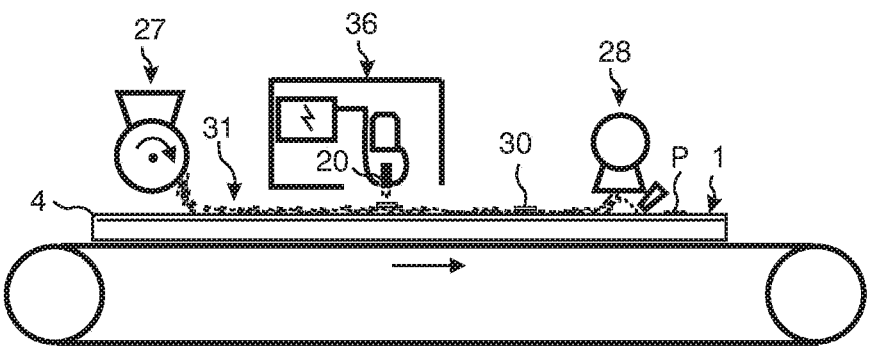

FIG. 3c shows a BAP printing equipment comprising a scattering station 27 that applies dry ink 31, a blank ink application station 36 that applies a blank ink pattern 30 with a print head 20 that preferably is a Piezo print head and a dry ink removal station 28 that removes the blank such that a digital print P is formed. The non bonded dry ink particles may be removed with airstreams that may be a combination of air pressure and vacuum. The substrate 4 of the panel 1 is preferably heated prior to the application of the dry ink.

Figure 3D:
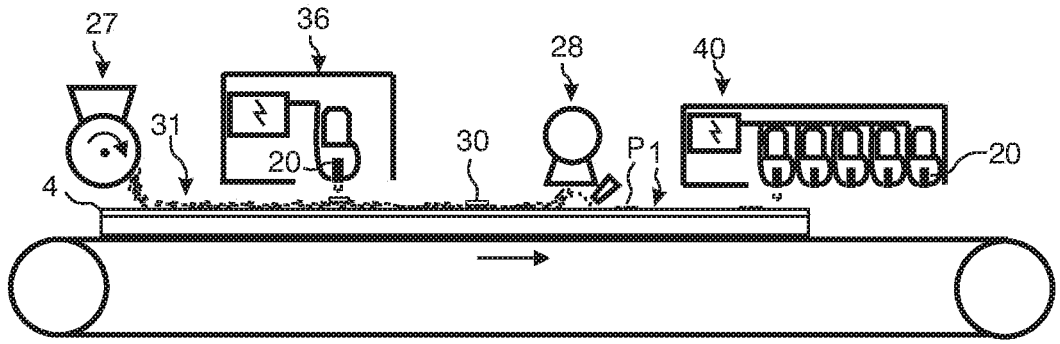

FIG. 3d shows a binder printing equipment similar to FIG. 3c that is combined with a digital printer that applies a water-based ink comprising colour pigments and binders. The advantage is that the forming of a digital print may be made in three steps comprising three different methods. A first base colour may be included in the substrate 4, preferably in a PVC foil. A second base colour may be applied with the BAP method. The first base colour and the second BAP base colour may provide the majority of the pigments required to form the digital print. A minor part of the pigments, preferably less than 20%, may be applied with a liquid pigment-based ink jet method. This is a very cost effective printing method. Another advantage is that the major part of the final printing step may be made on the second BAP colour that comprises powder particles and such particles may be used to prevent floating of the ink drops. This makes it possible to apply a water-based digital ink jet print on thermoplastic materials in normal production temperatures and no additional heating is needed.

Example 1—Formulation of a Water-Based Ink

An ink formulation was made for a Kyocera Piezo print head designed for inks with a viscosity of 5-6 cps. 30 wt % of an aqueous pigment dispersion and 10 wt % of an aqueous dispersion of a thermally crosslinkable acrylate copolymer dispersion (Helizarin binder from BASF) was mixed with 59 wt % of an aqueous viscosity increasing substance comprising de-ionized water, glycerine and diethylene glycol. 1 wt % BYK wetting agent was included in the ink. The viscosity was measured to 6 cps at 25° C. and the boiling point to 110° C.

Example 2—Digital Print at Increased Surface Temperature

A 4 mm LVT panel with a 0.1 mm white decorative PVC foil was heated to 100° C. and displaced under a Kyocera Piezo print head. A wood grain pattern was digitally printed on the hot surface with a water-based ink produced according to example 1. The water-based ink cured instantly and a high resolution print was obtained. A 0.4 mm transparent PVC foil was applied over the print and laminated under 160° C. and 10 bars pressure.

The print was repeated with a panel in room temperature and at 50° C., 60° C., and 70° C. All prints were of a very low quality with clusters of ink drops connected to each other. The ink was wet after application. A considerable improvement occurred at temperatures above 80° C. High quality prints were obtained in temperatures between 90-110° C. and the ink was dry at temperature above 100° C. The quality of the print decreased gradually in temperatures above the boiling point 110° C. of the ink.

The print was repeated on a high gloss aluminium foil that was heated to 100° C. A high quality print was obtained.

The invention claimed is:

1. A water-based ink comprising:
a colorant comprising an aqueous pigment dispersion;
a binder comprising an acrylic resin dispersion; and
a viscosity increasing substance,
wherein:
the material composition of the water-based ink is 15-35 wt % of the aqueous pigment dispersion, 5-20 wt % of the acrylic resin dispersion and 45-80 wt % of the viscosity increasing substance;
the boiling point of the water-based ink is above 100° C. and below 130° C.;
the viscosity of the water-based ink is above 2 cps and below 15 cps at 25° C.; and
the water-based ink is configured for digital printing on a substrate of a panel that after printing is pressed and heated to above 100° C.

2. The water-based ink of claim 1, wherein the acrylic resin dispersion is a thermally crosslinkable acrylate copolymer dispersion.

3. The water-based ink of claim 1, wherein the viscosity increasing substance is a liquid viscosity increasing substance.

4. The water-based ink of claim 3, wherein the liquid viscosity increasing substance comprises glycol or glycerine.

5. The water-based ink of claim 3, wherein the liquid viscosity increasing substance comprises a glycol or glycerine that is miscible with water, has a boiling point above 100° C. and a melting point lower than an application temperature.

6. The water-based ink of claim 3, wherein the liquid viscosity increasing substance comprises a glycol or glycerine that is miscible with water, and has a boiling point above 100° C.

7. The water-based ink of claim 3, wherein the liquid viscosity increasing substance comprises ethylene glycol or propylene glycol or polyethylene glycol or diethylene glycol or butane diol or glycerine.

8. The water-based ink of claim 3, wherein the liquid viscosity increasing substance further comprises de-ionized water as a solvent.

9. The water-based ink of claim 1, wherein the viscosity of the water-based ink is about 5-12 cps at 25° C.

10. The water-based ink of claim 1, wherein the boiling point of the water-based ink is about 105-120° C.

11. The water-based ink of claim 1, wherein the water-based ink is configured to transfer from a liquid state to a solid state within less than about one second when applied on a dense surface heated to about 100° C.

12. The water-based ink of claim 1, wherein the water-based ink comprises a wetting agent.

13. The water-based ink of claim 1, wherein the acrylic resin dispersion comprises 40-50 wt % of the acrylic binder.

14. The water-based ink of claim 1, wherein the acrylic resin dispersion further comprises at least one of water, surfactants, and additives.

15. A water-based ink comprising:
a colorant comprising an aqueous pigment dispersion;
a binder comprising an acrylic resin dispersion; and
a viscosity increasing substance,
wherein:
the material composition of the water-based ink is 15-35 wt % of the aqueous pigment dispersion, 5-20 wt % of the acrylic resin dispersion and 45-80 wt % of the viscosity increasing substance;
the boiling point of the water-based ink is above 100° C. and below 130° C.;
the viscosity of the water-based ink is above 2 cps and below 15 cps at 25° C.

* * * * *